United States Patent [19]

Klein

[11] 4,016,638
[45] Apr. 12, 1977

[54] DEVICE FOR ASSEMBLING THE STORAGE PLATES AND INSULATING PLATES OF LEAD-ACID BATTERIES

[75] Inventor: Jürgen Klein, Brilon, Germany

[73] Assignee: Accumulatorenwerk Hoppecke Carl Zoellner & Sohn, Cologne, Germany

[22] Filed: Dec. 22, 1975

[21] Appl. No.: 642,772

[30] Foreign Application Priority Data

Dec. 20, 1974 Germany ............................ 2460418

[52] U.S. Cl. .................................... 29/730; 29/763
[51] Int. Cl.² .......................................... H01M 2/00
[58] Field of Search ...................................... 29/204
[56] References Cited
UNITED STATES PATENTS 2,539,318  1/1951  Orsino ................................ 29/204
3,597,825  8/1971  Meislitzer ........................... 29/204

*Primary Examiner*—Willie G. Abercrombie
*Attorney, Agent, or Firm*—Joseph A. Geiger

[57] ABSTRACT

A device for positioning the storage plates and insulating plates of lead-acid storage batteries for the assembly of battery cells in such a way that the longitudinally larger insulating plates form a uniform lateral overhang on both sides, the device including two oppositely spaced parallel positioning members with inwardly protruding positioning knives cutting notches in the edges of the insulating plates. The positioning members, or only the positioning knives alone, are retractable horizontally.

3 Claims, 4 Drawing Figures

DEVICE FOR ASSEMBLING THE STORAGE PLATES AND INSULATING PLATES OF LEAD-ACID BATTERIES

BACKGROUND OF THE INVENTION

1. Field of the Invention

The present invention relates to plate assembly devices, and more particularly, to devices for assembling the storage plates and insulating plates of lead-acid batteries in the course of the assembly of battery cells.

2. Description of the Prior Art

The assembly of high-quality lead-acid storage batteries is subject to the requirement, among other things, that the insulating plates, or so-called separator plates, protrude on the upper as well as longitudinal sides by a uniform and consistent overhang, in order to eliminate the short circuit risk which is present when the separator plates overhang on one side only, for example. The tendency of using ever thinner separator plates further increases the risk of such a short circuit.

In the past, the most frequently used approach to obtaining a uniform overhang on both sides involved the initial assembly of elements in such a way that an overhang was formed on one side only, whereupon, in a subsequent repositioning operation, the separator plates were displaced longitudinally such a distance that they are centered with respect to the cell, for a uniform overhang.

SUMMARY OF THE INVENTION

Underlying the present invention is the objective of providing an assembly device which makes it possible to immediately obtain an axact longitudinal positioning of the storage plates and insulating plates during assembly of the cells for lead-acid batteries. The device is to be simple in structure and easy to operate.

The present invention proposes to attain this objective with a device having longitudinally movable positioning members arranged outside the lateral edges of the plates, the positioning members defining opposing abutment faces oriented at right angles to the bottom edges of the plates. The two positioning members carry each at least one positioning knife defining a sharp edge at a parallel distance inwardly of the abutment faces and running transversely to the edges of the storage plates. The distance of the knife edges from the abutment faces of the positioning members is equal to, or greater than the nominal overhang of the insulating plates.

The proposed assembly device makes it possible to obtain the accurate positioning of the plates in a single assembly operation, thereby affording considerable savings in assembly time and cost over the previously employed assembly method.

In a modified embodiment of the invention, the positioning knives are not rigidly attached to the positioning members, but are retractable and extendable with respect to the latter.

BRIEF DESCRIPTION OF THE DRAWING

Further special features and advantages of the invention will become apparent from the description following below, when taken together with the accompanying drawing which illustrates, by way of example, embodiments of the invention, represented in the various figures as follows.

DESCRIPTION OF THE PREFERRED EMBODIMENTS

Figure 1:
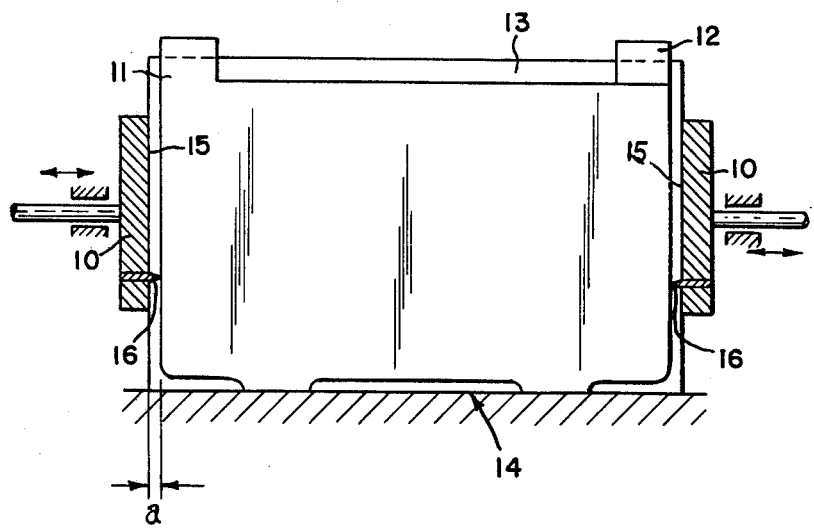
FIG. 1 shows the device of the invention in a schematic elevational view, in its operative position.

Referring to FIG. 1 of the drawing, the device of the invention consists of two positioning members 10 which are arranged in parallel, at a distance corresponding to the length of the battery cell elements. The latter include storage plates 11 and 12 and, depending upon the configuration of the cell, several insulating plates or separator plates 13. A lead-acid battery typically consists of a number of these battery cells. The storage plates 11 and 12 are supported on a table or base plate 14. The separator plates 13 are longer than the storage plates 11 and 12, and therefore protrude laterally over the storage plates by a uniform overhang $a$. The positioning members 10 are in the form of flat upright plates, reaching laterally over the entire width of a cell. The opposing abutment faces 15 of the two positioning members 10 are oriented perpendicularly to the base plate 14, and they are so spaced that the insulating plates 13 fit longitudinally between them.

Figure 2:
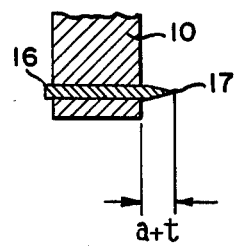
FIG. 2 shows an enlarged cross-sectional detail of the device of FIG. 1.
Figure 3:
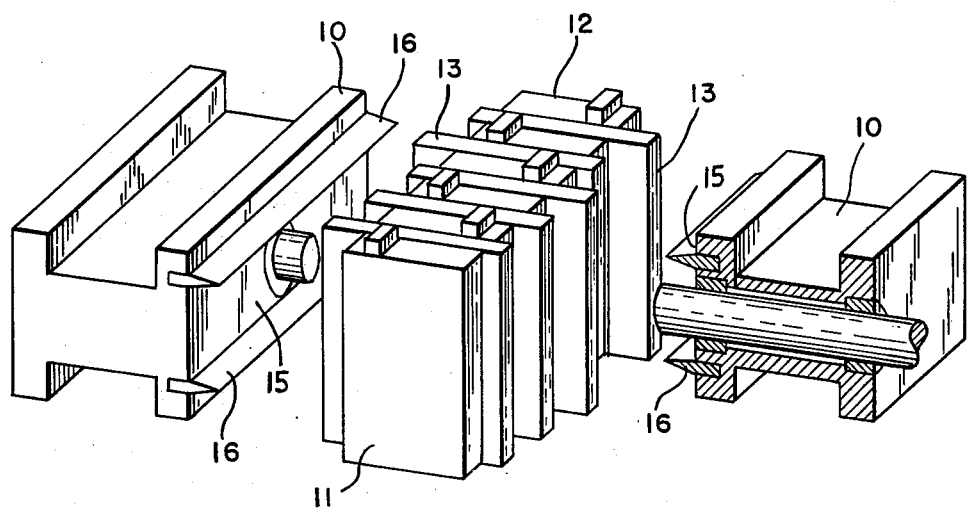
FIG. 3 shows the device of FIG. 1 in a perspective representation, prior to the approach motion.
Figure 4:
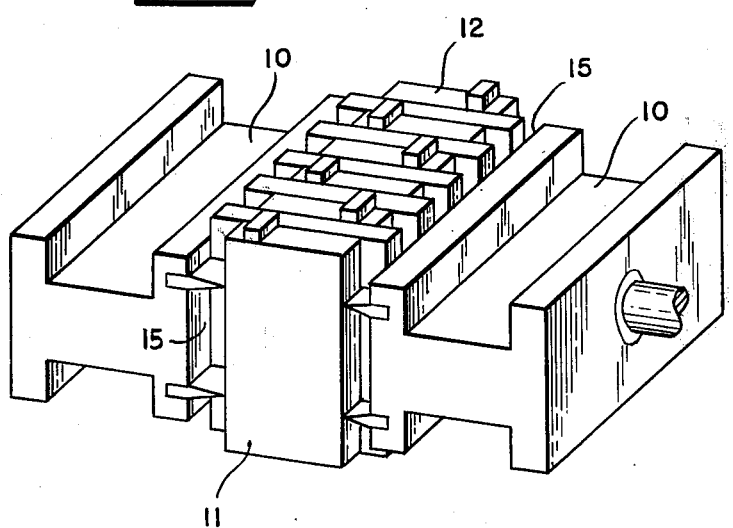
FIG. 4 shows the operative position of the device of FIG. 3.

Each positioning member carries a horizontally oriented positioning knife 16 extending parallel to the abutment face 15 of the positioning member and also to the base plate 14. Each positioning knife 16 has a horizontally pointing knife edge 17 protruding from the abutment face 15 of the positioning member 10 by an amount $a + t$, the expression $t$ representing the regular manufacturing tolerance for the overhang $a$ (see FIG. 2). Each positioning member 10 may be equipped with several identical positioning knives 16 as shown in FIGS. 3 and 4.

The positioning members 10 are preferably so arranged that they can be moved towards and away from the lateral edges of the cell, a great number of suitable drives for such $a$ to and fro motion being suitable for this purpose. Accordingly, the drive is not specifically shown in the drawing; it may be of the mechanical, pneumatic, hydraulic, or electrical type.

In a modified embodiment of the invention, the positioning knives 16 are made retractable with respect to the positioning plates 10, in which case the positioning plates 10 may be arranged to be stationary, having a distance between their abutment faces which corresponds to the length of the insulating plates 13, plus the regular manufacturing tolerance. The storage plates 11 and 12 are then centered with respect to the insulating plates 13 by simply advancing the knives 16 against the latter, thereby cutting small notches into the edge portions of the insulating plates 13, while centering the storage plates. The depth of knife penetration is limited by means of a suitable knife stop.

The small notches which are being cut into the edge portions of the insulating plates 13 have proved to be of no consequence in regard to the operating performance of the battery cells which have been assembled with the novel device of this invention.

It should be understood, of course, that the foregoing disclosure describes only preferred embodiments of the invention and that it is intended to cover all changes and modifications of these examples of the invention which fall within the scope of the appended claims.

I claim the following:

1. A device for positioning the storage plates and insulating plates of lead-acid storage batteries for the assembly of battery cells in such a way that the longitudinally larger insulating plates form a uniform lateral overhang on both lateral sides, the device comprising in combination:

plate means for supporting the storage plates and insulating plates in a generally vertical orientation;

two longitudinally spaced positioning members having abutment faces in parallel opposite alignment, at a distance corresponding substantially to the length of the insulating plates, thereby positioning the latter;

at least one positioning knife protruding inwardly from each positioning member to a distance substantially equal to the intended lateral overhang of the insulating plates relative to the storage plates, so that opposing knife edges define between them a longitudinal distance which is substantially equal to the lesser length of the storage plates, thereby centrally positioning the storage plates with respect to the insulating plates, and whereby the edge portions of the insulating plates have notches cut into them by the protruding positioning knives; and means for longitudinally retracting and advancing at least the knives themselves, for the insertion and removal of the insulating plates.

2. An assembly device as defined in claim 1, wherein the positioning members include means for guiding them for a to and fro motion in relation to the lateral edges of said plates; and the longitudinal retracting and advancing means includes drive means producing said to and fro motion of the positioning members.

3. An assembly device as defined in claim 2, wherein said guide means and drive means are adapted for horizontal straight-line motions.

* * * * *